United States Patent

Böhmler et al.

[11] Patent Number: 4,715,009
[45] Date of Patent: Dec. 22, 1987

[54] DEVICE FOR DETERMINING ANGULAR POSITION OF A ROTATING PART

[75] Inventors: Heinz Böhmler, Pleidelsheim; Rolf Däumer, Weil der Stadt; Dieter Mayer, Wangen In Allgau; Egbert Perenthaler, Stuttgart, all of Fed. Rep. of Germany

[73] Assignee: Robert Bosch GmbH, Stuttgart, Fed. Rep. of Germany

[21] Appl. No.: 804,656
[22] PCT Filed: Mar. 13, 1985
[86] PCT No.: PCT/DE85/00080
§ 371 Date: Nov. 12, 1985
§ 102(e) Date: Nov. 12, 1985
[87] PCT Pub. No.: WO86/00415
PCT Pub. Date: Jan. 16, 1986

[30] Foreign Application Priority Data

Jun. 27, 1984 [DE] Fed. Rep. of Germany ....... 3423664

[51] Int. Cl.$^4$ ................................................. G01P 3/42
[52] U.S. Cl. ..................... 364/565; 324/176; 324/178
[58] Field of Search .............. 364/565, 431.03, 431.07; 324/160, 161, 176, 178

[56] References Cited

U.S. PATENT DOCUMENTS 4,356,447 10/1982 Hönig et al. ................. 364/565 X
4,449,191 5/1984 Mehnert ........................ 364/565 X
4,506,339 3/1985 Kühnlein ............................. 364/565

FOREIGN PATENT DOCUMENTS 0130762 1/1985 European Pat. Off. .
3011822 3/1980 Fed. Rep. of Germany .
3031357 4/1982 Fed. Rep. of Germany .

Primary Examiner—Gary V. Harkcom
Assistant Examiner—H. R. Herndon
Attorney, Agent, or Firm—Michael J. Striker

[57] ABSTRACT

A device for picking up the position of an angle of a rotating part which is provided with angle markers 11 or teeth being simultaneously distributed over its circumference, whereby at least one angle marker and/or intermediate space between two angle markers is shaped differently serving as a reference marker 12. This can be realized, for example, by a wide or smaller angle marker or gap between two angle markers. The distance between two angle marker flanks is picked up by a counter 17 which counts a cycle frequency, whereby the counter is a free running continuously counting counter. The instantaneously present counter level is transmitted into a storage 18 for each angle marker flank (ascending flank or rear flank) to be evaluated. Subtractions of two successive storage values and comparisons of successive corresponding differential values are performed for recognizing a reference marker. A reference marker signal is generated during a deviation of a differential value by a predetermined dimension from the established differential value, preferably before or after.

4 Claims, 2 Drawing Figures

DEVICE FOR DETERMINING ANGULAR POSITION OF A ROTATING PART

STATE OF THE ART

The invention is based on a device for determining angular position of a rotating disk having on its circumference a plurality of uniformly distributed angle markers and at least one reference marker, the device including a sensor of the markers, and a counter of output pulses from the sensor. Such devices give information about rotational speed and angular position of a rotating part, and are used for control devices in internal combustion engines, in particular for ignition and fuel injection controls. They have the advantage that both parameters can be picked up with a simple transmitter. Such devices are known, for example, from DE-OS No. 23 57 061, DE-OS No. 29 39 643, DE-OS No. 29 39 643, GB No. 2,065,310, DE-OS No. 30 11 822 as well as from U.S. Pat. No. 4,321,580, wherein different possibilities are indicated to provide a reference marker between the angle markers which are uniformly distributed over the circumference of a transmitter. The angle markers are usually designed in form of teeth, whereby the reference marker may be a missing tooth, a wider or smaller tooth or tooth distance, a slotted, beveled, halved or milled tooth, a tooth made from a different material or a half tooth in the transverse direction.

The picking up of the reference markers is known from GB No. 2,065,310 as well as from U.S. Pat. No. 4,321,580 in form of a counter which counts a cycle frequency. The counter can change its counting direction either at a defined flank of a tooth (front or rear flank), or it can be set for a determined counting value. Therefore, the counter operates synchronously with respect to the angle markers and is therefore exclusively used for this purpose.

ADVANTAGES OF THIS INVENTION

In contrast thereto, the device in accordance with the present invention is advantageous in that neither counter synchronizations have to be performed with the angle marker flanks, nor any frequency multiplications or similar PLL-like processes have to be made. Since the counter is completely free running and synchronously counts the angle markers, it may be additionally used for other purposes. The information concerning the instantaneous rotational speed of the rotating part is present at any time without any special measures.

Due to the measures stated in the subclaims advantageous further embodiments and improvements of the device stated in the main claim are made possible. Particularly advantageous is the simultaneous evaluation of three successive difference values which are recovered from storage values, whereby a reference marker is recognized when the mean difference value deviates from the other two by a predetermined magnitude. Thus, an erroneous recognition of a reference marker caused by torsion, vibration or rotational speed dynamics can be prevented. Furthermore, it is also possible to subsequently correct a displacement of the angle reference by an increment after, early or late, with the aid of the three measured difference values.

DRAWING

One exemplified embodiment of the invention is illustrated in the drawings and explained in more detail in the following description.

DESCRIPTION OF THE EXEMPLIFIED EMBODIMENT

Figure 1:
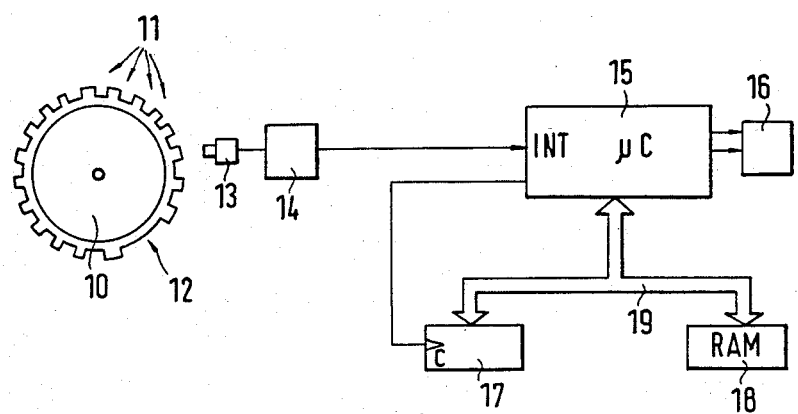
FIG. 1 illustrates the block diagram of an exemplified embodiment.

A disk-shaped rotating part 10 which is preferably connected with the crankshaft or the cam shaft of an internal combustion engine is provided with tooth-shaped angle markers 11 which are uniformly distributed over the circumference thereof. A reference marker 12 is provided between two angle markers either as a missing tooth or a larger gap. Naturally, the reference marker may be shaped differently, for example, in accordance with one of the embodiments of the aforementioned state of the art. An inductive pick-up unit or receiver 13 scans the angle markers 11, whereby the induced signal is shaped as a rectangular signal in a preparation circuit 14 which is structured as a comparator, for example.

In addition to the inductive picking up of the angle markers this can be also alternatively performed in accordance with an optical, capacitive or high frequency process. Thereby, the angle markers may be shaped as slots or holes.

The output of the preparation circuit 14 is connected with the interruption input (INT) of a microprocessor or microcomputer 15 whose output side controls end stages 16 for controlling the ignition and/or fuel injection. Naturally, further parameters for the latter required which are not illustrated in detail for simplification sake. A counter 17 and a storage 18 which preferably is designed as a RAM, are connected through a bus system 19 with the microcomputer 15. The counting cycle or clock frequency for the counter is generated internally in the microcomputer 15 and is fed to the clock input of this counter 17. To obtain high accuracy, the counter cycle frequency or clock rate is constant and is substantially higher than the frequency of the angle markers 11 passing by the receiver 13 at the highest rotational speed of the disk 10. With a teeth number of 180 the maximum angle marker frequency is about 20 kHz, so that a clocking frequency of the counter of about 200 to 500 kHz is sufficient.

Figure 2:
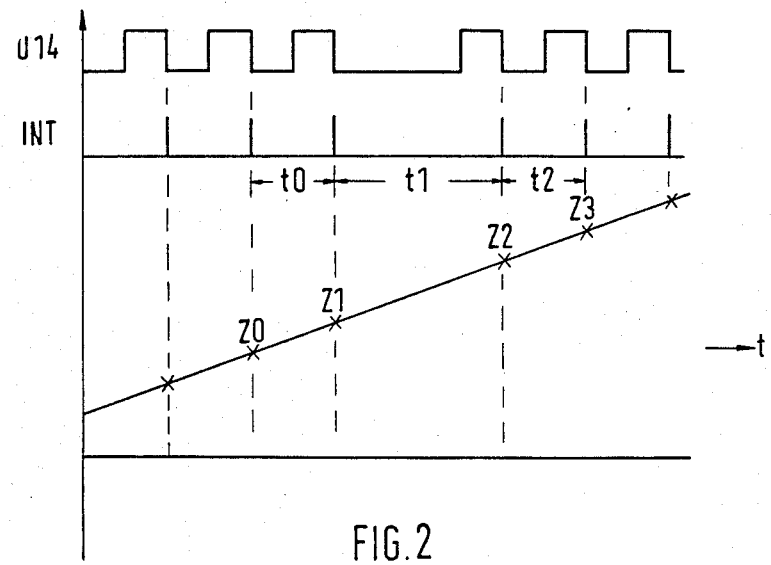
FIG. 2 illustrates a signal diagram explaining the mode of operation.

In the following, the mode of operation of the signal diagram illustrated in FIG. 2 will be explained in conjunction with FIG. 1. The prepared angle marker signals are illustrated therein as a signal sequence U14. After the third angle marker signal a signal gap appears due to a missing or flattened tooth which serves as a reference marker.

Due to the dynamic input of the microprocessor, an interrupting signal INT is generated with each rear flank of each signal U14. The interrupting signal causes that the count present at that moment in the counter 17 is taken over by a storage cell of storage 18. The storage 18 preferably operates in the manner of a shift register, whereby stored values which correspond to four counts are simultaneously present in the storage. The counter 17 continuously counts the clock pulses which are fed to the counter, whereby no counter synchronisation with respect to the angle markers is present, i.e., the counter operation itself is completely independent from the evaluation of the angle markers or the reference markers. Thereby the counter 17 operates in the manner of a ring counter.

To determine the picking up of a reference marker, the time intervals between the flanks of two angle markers are defined, whereby the time intervals (t0, t1, t2) of three successive period of the signal U14 are compared with each other. The time intervals or numerical values corresponding to the time intervals result from the difference of counts stored in the storage at the time points of corresponding rear flanks of the signal U14. Thus, the result for the three successive periods is $$t0 = Z1 - Z0$$

$$t1 = Z2 - Z1$$

$$t2 = Z3 - Z2.$$

In the case of angle markers the determined time intervals are essentially uniform and depend on acceleration conditions of the disk. However, if a reference marker gap appears in accordance with FIG. 2, the corresponding time interval t1 becomes substantially longer than the preceding and subsequent time intervals t0 or t2. A reference marker is recognized if the intermediate time interval t1 deviates by a predetermined magnitude from the preceding time interval and the subsequent time interval. Hence, the condition for recognizing the reference marker is as follows:

$$t1 \cdot n > t0 \text{ and}$$

$$t1 \cdot n > t2.$$

In the illustrated case the magnitude or factor $n = \frac{2}{3}$ is selected, for example. This simple mathematical comparison is performed in the microcomputer 15 which then feeds the angle marker information to the end stages 16 after picking up and evaluating the count Z3. Thereby, the factor n must be so selected that errors caused by torsional vibrations or rotational speed dynamic are prevented.

The information about the next appearance of the reference marker can be determined in the microcomputer from the number of teeth in the toothed rim of disk 10. However, if the corresponding time interval t1 of the subsequent period is not recognized as a reference marker gap, it can be tested whether one of the two adjacent periods t0 to t2 fulfills the aforementioned condition for recognizing the reference marker. If this is the case, the failure to detect an angle marker flank or an additional false detection of such a flank, due to interferences, for example, can be compensated by correcting the angle reference. Thus, the angle marker can be redundantly picked up.

If a slotted angle marker or a reduced distance is used instead of a missing angle marker or a widened gap between two angle markers, a number value larger than 1 must be selected for the factor n and the condition $>$ must be replaced by the condition $<$.

The determined time intervals t0, t2 or numerical values proportional to the time intervals may be simultaneously used as rotational speed information, since they are directly reciprocal to the rotational speed. In this manner the reference marker as well as the rotational speed can be picked up with a single counter 17 and a single storage 18, whereby the counter 17 as well as the storage spaces of the storage are usable for other purposes.

What is claimed is:

1. Device for determining angular position of a rotating disk having on its circumference uniformly distributed angle markers and a reference marker differing from said angle markers, comprising a receiver unit for sensing spaces between corresponding points of successive angle markers and delivering output pulses at a cycle rate of the rotating disk, a continuously clocked counter coupled to said receiver unit to deliver in response to each output pulse a count of clock pulses; said clock rate exceeding a maximum cycle rate of said disk; storage means coupled to said counter to store four successive counts from said counter; and comparing means connected to said storage means to compare the stored four successive counts, said comparing means delivering three successive difference values whereby a reference marker is recognized when the intermediate difference value deviates by a predetermined magnitude from the remaining two difference values.

2. Device in accordance with claim 1, wherein said difference values are used as rotational speed information.

3. Device in accordance with claim 1 comprising a microcomputer having an interrupt input and containing said counter, said storage means and said comparing means, said interrupt input being connected to said receiver unit.

4. Device in accordance with claim 1, wherein said counter is a ring counter.

* * * * *